United States Patent [19]

Vermillion et al.

[11] 4,286,022
[45] Aug. 25, 1981

[54] COATING OF FINE PARTICLES IN POLYURETHANE BLOCK COPOLYMER BINDER

[75] Inventors: Russell L. Vermillion, Hastings; William A. Bernett, North Oaks, both of Minn.

[73] Assignee: Minnesota Mining and Manufacturing Company, St. Paul, Minn.

[21] Appl. No.: 181,129

[22] Filed: Aug. 25, 1980

Related U.S. Application Data

[63] Continuation-in-part of Ser. No. 4,816, Jan. 19, 1979, abandoned.

[51] Int. Cl.$^3$ .......................... B32B 27/40; B05D 5/12
[52] U.S. Cl. ............................. 428/423.1; 252/62.54; 252/62.56; 427/128; 427/130; 428/425.9; 428/480; 428/900
[58] Field of Search ............... 428/425, 483, 423, 329, 428/900, 423.1, 425.9, 539, 480; 252/62.54, 62.56; 427/128, 130

[56] References Cited

U.S. PATENT DOCUMENTS

| | | | |
|---|---|---|---|
| 3,419,420 | 12/1968 | Stahly et al. | 428/483 |
| 3,460,984 | 8/1969 | Bisschops et al. | 428/900 X |
| 3,490,945 | 1/1970 | Slovinsky | 428/900 X |
| 4,152,484 | 5/1979 | Bachmann et al. | 428/539 |

FOREIGN PATENT DOCUMENTS

1132957  11/1978  United Kingdom

*Primary Examiner*—Thomas J. Herbert, Jr.

[57] ABSTRACT

Coating of fine particles such as magnetizable particles in a binder which is a soluble hydroxyl-terminated polyurethane block copolymer comprising soft or flexible blocks synthesized from polyester or polyether diols and hard blocks synthesized from aliphatic diols containing tertiary amine and p,p'-diphenylmethane diisocyanate. The block copolymer is capable of dispersing as well as acting as a binder for the particles.

14 Claims, No Drawings

COATING OF FINE PARTICLES IN POLYURETHANE BLOCK COPOLYMER BINDER

CROSS-REFERENCE TO RELATED APPLICATIONS

This application is a continuation-in-part of applicants' copending application Ser. No. 4,816, filed Jan. 19, 1979, now abandoned.

FIELD OF THE INVENTION

This invention concerns coatings of fine particles such as magnetizable particles and a binder on a substrate, primarily the coatings of magnetic recording media.

BACKGROUND OF THE INVENTION

In the art of applying coatings comprising magnetizable particles dispersed in a nonmagnetizable elastomeric binder, a dispersing agent is normally employed to disperse the magnetizable and any other fine particles, usually in amount of 10–50% by weight of the binder composition. Since the dispersing agent remains in the coating, it tends to have a plasticizing effect which weakens the binder. Consequently, the coating exhibits inferior wear resistance and eventually releases debris. Furthermore, the dispersing agent can contribute to the migration of low-molecular-weight materials within the coating and their exudation onto the recording surface.

Dispersing agents are likewise used in applying coatings comprising fine particles which are not magnetizable such as the conductive carbon black of controlled-wind backside coatings of many magnetic recording tapes. These and any other coatings comprising dispersions of fine particles in elastomeric binders involve the same problems.

Some binders and some dispersing agents which are highly effective for the magnetizable particles of a given recording medium may be less effective for the non-magnetizable particles of its magnetizable and backside coatings, thus possibly requiring an inventory of more than one binder and more than one dispersing agent.

The above-mentioned debris problem may be minimized if the dispersing agent has one or more functional groups which will react with crosslinking agent for the binder plus one or more additional groups which will be adsorbed by the particles of the dispersions. See U.S. Pat. No. 3,460,984 (Bisschops et al.). British Pat. No. 1,132,957 (Graubart) employs a melamine-formaldehyde resin as a dispersing agent and it may also function as a crosslinking agent in a polyurethane binder of a magnetic recording medium.

A dispersing agent which crosslinks the binder tends to react with the binder in the coatable dispersion so that within a fairly short period of time, the dispersion no longer can be used. Hence, the dispersion must be made up in small batches shortly before use.

U.S. Pat. No. 3,490,945 (Slovinsky) discloses a polyurethane binder for magnetic recording media which itself is a dispersing agent. The polyurethane binder is a moisture-cured diisocyanate-terminated prepolymer containing surface-active tertiary or quaternary nitrogen. While this theoretically should have solved the aforementioned problems, it is believed that to date there has been no elastomer on the market which both acts as a high-quality binder and also effectively disperses inorganic particles. The polyurethane binder of the Slovinsky patent may not have become commercial because of the impracticability of formulating the binder under dry conditions and keeping the dispersion under a dry atmosphere, and the moisture-curing might cause some foaming.

U.S. Pat. No. 3,419,420 (Stahly) also discloses a recording tape binder which has a dispersing capability, but it too has apparently not become commercial.

The Present Invention

The present invention concerns what is believed to be the first commercially feasible magnetic recording medium having a coating comprising a uniform dispersion of magnetizable particles in a binder where no dispersing agent is needed. Such binder, which itself is believed to be novel, has effectively dispersed acicular gamma-$Fe_2O_3$ particles without the assistance of a dispersing agent. However, it may be desirable to add small amounts of a dispersing agent for magnetizable particles which are more difficult to disperse, e.g., fine magnetite and chromium dioxide particles. The novel binder also has effectively dispersed nonmagnetizable particles commonly used in magnetic recording media such as carbon black and aluminum oxide.

The invention should also be useful for providing coatings of abrasive sheet material and other applications.

Briefly, the novel binder primarily comprises a hydroxyl-terminated polyurethane block copolymer comprising polyester or polyether segments, each having an average molecular weight of 200–3000, short-chain aliphatic segments, at least 10 mole percent of which contain tertiary and/or quaternary nitrogen, and symmetrical, unbranched, aromatic urethane segments interconnecting the polyester or polyether and short-chain aliphatic segments, said terminal hydroxyls being connected to said short-chain aliphatic segments. By short-chain is meant chains averaging 12 carbon atoms or less which are unbranched or have methyl or ethyl side chains. A larger average chain length or longer side chains would inhibit the otherwise high tenacity of the block copolymer. If the average molecular weight of the polyester or polyether segments were less than 200, the novel block copolymer would tend to lack the flexibility required of a good binder, whereas above about 3000, the polyester or polyether segments would tend to exhibit unwanted crystallinity. A range of 400–2000 is preferred.

A particularly preferred symmetrical, unbranched, aromatic diisocyanate is p,p'-diphenylmethane diisocyanate. Others are p-xylene diisocyanate; 1,4-bis(2-isocyanatoethyl) benzene; and 1,5-naphthalene diisocyanate.

The novel polyurethane block copolymer may be made by the sequential steps of (a) inter-reacting in solution excess soluble p,p'-diphenylmethane diisocyanate with a hydroxyl-terminated polyester or polyether having an average molecular weight of 200–3000 to provide a mixture of isocyanate-capped polyurethane and unreacted diisocyanate and (b) chain-extending that mixture with short-chain aliphatic diol, 10–100 mole percent of which contains tertiary nitrogen to produce a soluble hydroxyl-terminated polyurethane block copolymer. If desired, there may be a subsequent step of (c) quaternizing some or all of the tertiary nitrogen. Generally this additional step involves an expense which cannot be justified.

If 60-100 mole percent of the aliphatic diol employed in step (b) contains tertiary amine, the novel block copolymer may be softer than is desirable for use as a binder for magnetic media coatings. When part of the short-chain diol employed in step (b) has no tertiary amine, it is preferred for ease of processing that the polyurethane produced in step (a) first be chain-extended in the presence of excess isocyanate with that portion of the diol which contains tertiary nitrogen and then be further chain-extended with the portion of the diol which has no tertiary nitrogen to produce the soluble hydroxylterminated polyurethane block copolymer. Hence, 10-60 mole percent of the diol contains tertiary nitrogen and correspondingly 90-40 mole percent does not.

Preferred nitrogen-free short-chain diols are straight-chain aliphatic diols of 2 to 6 carbon atoms, especially 1,4-butanediol and comparable diols having one or two methyl or ethyl side chains such as neopentyl glycol. A short-chain aliphatic diol may contain one cycloaliphatic group such as cyclohexane dimethanol.

Preferred diols containing tertiary amine are similar to the aforementioned nitrogen-free short-chain diols except for their tertiary amine. Preferred is N-methyldiethanolamine.

Preferred hydroxyl-terminated polyethers contain multiple methylene ($-CH_2-$)$_x$ units interconnected by ether linkages. Preferred hydroxyl-terminated polyesters consist essentially of multiple methylene ($-CH_2-$)$_x$ units interconnected by ester linkages.

Upon dissolving the polyurethane block copolymer in sufficient volatile vehicle to provide a coatable dispersion of fine magnetizable and/or other particles, the dispersion can be coated out onto a substrate to provide a smooth, uniform coating without any added dispersing agent. The dispersion may contain other substances such as lubricants commonly used in coatings of magnetizable particles to reduce friction with magnetic heads. It is often desirable that a crosslinking agent for the novel polyurethane block copolymer be added to the coatable dispersion immediately prior to its use. Such crosslinking tends to produce a tougher, more durable and heat- and solvent-resistant coating, as is known in the art and is especially significant for magnetizable coatings involving high-speed contact with magnetic heads. Generally a magnetizable coating comprises a major proportion by weight of fine magnetizable particles and a minor proportion by weight of binder.

The binder may include additional polymeric material such as a phenoxy resin (e.g., Union Carbide PKHH which is a thermoplastic copolymer of equivalent amounts of bisphenol A and epichlorohydrin) which provides a somewhat harder coating. Other useful such materials are vinyl chloride polymers (e.g., Union Carbide VROH and VAGH which are partially hydrolyzed vinyl chloride/vinyl acetate copolymers).

The volatile vehicle for the coatable dispersion should primarily comprise nonaromatic polar solvent such as dimethyl formamide, tetrahydrofuran or cyclohexanone. Aromatic solvents such as toluene which are often used in making magnetic recording media may cause the binder system to gel prematurely.

The following Examples 1-7 illustrate hydroxyl-terminated polyurethane block copolymers of the invention, and Examples 8-9 show preparations of illustrative coatings of those block copolymers. In each, parts are given by weight.

EXAMPLE 1

42.2 parts of 4,4'-diphenylmethane diisocyanate (below called "MDI") was dissolved in 70 parts of tetrahydrofuran solvent in a stainless steel pressure reactor, equipped with a paddle mixer. After heating to 65° C., 36 parts of polytetramethylene ether glycol (below called "PTMEG") of 650 average molecular weight was added. With continued mixing, the mixture was heated to about 125° C. until the NCO content stabilized, and another 136 parts of tetrahydrofuran was added. While holding the temperature at about 80° C., 3.6 parts of N-methyldiethanolamine (below called "MDEA") was added, and 7.5 parts of 1,4-butanediol (below called "BD") was added 30 minutes later. The temperature was then increased to 130° C. and the reaction process was continued, until the NCO content was less than 0.3%. The inherent viscosity of the resultant hydroxylterminated polyurethane block copolymer was 0.75 (measured in tetrahydrofuran). The batch was then diluted with tetrahydrofuran to 17% solids to provide a solution which is below called "Product of Example 1".

EXAMPLE 2

To 100 parts of Product of Example 1 under a nitrogen atmosphere in the reactor of Example 1 was added 0.89 part of methyl iodide with slow mixing for 24 hours at 22° C., thus quaternizing the tertiary nitrogen of the diol segments.

EXAMPLES 3-6

The hydroxyl-terminated polyurethane block copolymers of Examples 3-6 were prepared in the same manner as that of Example 1, except as indicated in Table I wherein the ingredients are listed in the order they were added.

TABLE I

| Example | Parts by Weight | | | | |
|---|---|---|---|---|---|
| | 1 | 3 | 4 | 5 | 6 |
| MDI | 42.2 | 42.2 | 42.2 | 42.2 | 42.2 |
| THF | 70 | 58.25 | 50.62 | 49.19 | 89.86 |
| PTMEG 650 | 36 | 22.88 | | | |
| PTMEG 1000 | | | | | 58.20 |
| Neopentyl glycol | | | 14.36 | 12.76 | |
| THF | 136 | 123.93 | 110.95 | 104.79 | 169.34 |
| Neopentyl glycol | | | | | 8.47 |
| MDEA | 3.6 | 3.36 | 2.02 | 4.06 | 3.49 |
| BD | 7.5 | 9.5 | | | |
| Polyester | | | 11.46 | 10.18 | |

The polyester used in Examples 4 and 5 was polyepsilon-caprolactone having an average molecular weight of 830 ("Niax" D-520 of Union Carbide).

EXAMPLE 7

The tertiary nitrogen of the hydroxyl-terminated polyurethane block copolymer of Example 6 was quaternized in the same way as in Example 2 except using 4.55 parts of the methyl iodide.

The Products of Examples 1 and 3-5 were spin cast and cut to provide test specimens as described in ASTM Test Methods E111-61 and D638-76. Results are reported in Table II.

TABLE II

| Example | 1 | 3 | 4 | 5 |
|---|---|---|---|---|
| Tensile strength, dynes/cm$^2$ | $54 \times 10^7$ | $60 \times 10^7$ | $76 \times 10^7$ | $69 \times 10^7$ |
| Elongation at break, percent | 420 | 350 | 5.8 | 5.3 |
| 100% Modulus, dynes/cm$^2$ | $16 \times 10^7$ | $34 \times 10^7$ | | |
| 300% Modulus, dynes/cm$^2$ | $38 \times 10^7$ | $55 \times 10^7$ | | |
| Young's Modulus, dynes/cm$^2$ | | | $16 \times 10^9$ | $15 \times 10^9$ |

EXAMPLE 8

(Preparation of Magnetic Recording Tape)

The following charges were used:

| Charge | | Parts by Weight |
|---|---|---|
| A | Acicular gamma-Fe$_2$O$_3$ particles | 110 |
|  | Product of Example 1 | 32.4 |
|  | Aluminum oxide | 1.65 |
| B | Tetrahydrofuran | 77.1 |
| C | Carbon black | 4.9 |
|  | Product of Example 1 | 13.75 |
| D | Product of Example 1 | 93.6 |
|  | Tetrahydrofuran | 75.9 |
| E | Product of Example 1 | 93.6 |
|  | Tetrahydrofuran | 75.9 |

The acicular particles had an average length of 0.8 micrometer, an average diameter of 0.1 micrometer and a surface area measured by nitrogen adsorption of 12.2m$^2$/g. Charge A was milled for 20 minutes in a ball mill containing 1930 parts of 1.6-cm stainless steel balls, after which Charge B was added. Before Charge C and before each subsequent charge was added, milling was continued until a smooth, coatable dispersion was obtained, with additional tetrahydrofuran added as necessary to reduce the viscosity to about 50 centipoises. Throughout the milling, the temperature was maintained close to 30° C. and not allowed to exceed 38° C.

The final dispersion was rotogravure-coated onto biaxially-oriented polyethylene terephthalate film 36 micrometers in thickness. Immediately prior to coating, 3.3 parts of a lubricant and 4.63 parts of a 60% solids solution of a crosslinker were stirred into the dispersion. That solution consisted of an adduct of toluene diisocyanate and trimethylolpropane in a solvent mainly comprising 25/15 ethyl-glycol acetate/xylol ("Mondur" CB-60).

After drying in an oven, the magnetizable coating was super-calendered to provide a surface smoothness of about 7 microinches (0.18 micrometer) peak-to-peak. The magnetizable coating had the following properties:

| Thickness | 14 micrometers |
|---|---|
| Coercivity | 345 oersteds |
| B$_r$ | 824 gauss |
| $\phi_r$ | 0.72 line per cm |
| $\phi_r/\phi_{max}$ | 0.81 |

The resultant magnetic recording tape was slit to a width of 12.7 mm and stored at 60° C. and 95% relative humidity. About every two weeks the roll of tape was temporarily held for 24 hours at 22° C. and 50% relative humidity and tested using an IBM 3420, Model 8, computer tape transport. After driving the tape in contact with the heads at 5.08 m/sec until 732 meters of tape had passed the heads, the tape was stopped, and the tape and heads were examined with the naked eye for debris. None was noted until after the roll of tape had been stored for 75 days, at which point the running test produced a faint residue on the heads. Of a great many commercial tapes which had previously been subjected to this test, the best tape showed a residue after 35–55 days.

EXAMPLE 9

(Backside Coating for Magnetic Recording Tape)

The following charges were used:

| Charge | | Parts by Weight |
|---|---|---|
| A | Tetrahydrofuran | 2.81 |
|  | Toluene | 2.35 |
|  | Product of Example 3 | 30.38 |
|  | Carbon black | 2.50 |
| B | Tetrahydrofuran | 9.28 |
|  | Toluene | 1.85 |
| C | Tetrahydrofuran | 24.66 |
|  | Toluene | 2.74 |
| D | Crosslinker solution ("Mondur" CB-60) | 0.60 |

After grinding Charge A in a sandmill for one hour, solvent in the ratio of Charge C was added to reduce the viscosity to 50 centipoises. Charge B was then added with continued milling for about 4 hours until a smooth coatable dispersion was obtained. Charge C was then added with milling for about another 30 minutes to provide a smooth coatable dispersion.

Immediately after stirring Charge D into the dispersion, it was coated onto the backside of a magnetic recording tape having a biaxially-oriented polyethylene terephthalate film backing. After the coating had been dried to a thickness of 2–3 Micrometers, it proved to be effective as a controlled-wind backside coating.

The carbon black used in Example 9 was Ketchenblack EC which had an average particle size of 30 nanometers and a surface area measured by nitrogen adsorption of 1000 m$^2$/g. Other carbon blacks which have been successfully employed in the present invention are Vulcan XC-72 and Shawinigan which respectively had an average particle size of 29 and 42 nanometers and a surface area of 230 and 65 m$^2$/g.

We claim:

1. In a coating comprising fine particles and a binder on a substrate, the improvement comprising: said binder primarily comprises a hydroxyl-terminated polyurethane block copolymer comprising polyester or polyether segments, each having an average molecular weight of 200–3000, short-chain aliphatic segments, 10–100 mole percent of which contain tertiary and/or quaternary nitrogen, and symmetrical, unbranched, aromatic urethane segments interconnecting the polyester or polyether and short-chain aliphatic segments the terminal hydroxyls being connected to said short-chain aliphatic segments.

2. In a magnetic recording medium comprising a backing member and at least one coating comprising fine particles and a binder, the improvement comprising: said binder comprises a hydroxyl-terminated polyurethane block copolymer comprising polyester or polyether segments each having an average molecular weight of 200–3000, short-chain aliphatic segments, 10–60 mole percent of which contain tertiary and/or quaternary nitrogen, and p,p'-diphenylmethane urethane segments interconnecting the polyester or polyether and short-chain aliphatic segments.

3. In a magnetic recording medium as defined in claim 2, the further improvement comprising:

each of the polyester or polyether segments has an average molecular weight of 400–2000.

4. In a magnetic recording medium as defined in claim 2, the further improvement comprising:

10–60 mole percent of the short-chain aliphatic segments are residues of N-methyldiethanolamine.

5. In a magnetic recording medium as defined in claim 4, the further improvement comprising:

the balance of the short-chain aliphatic segments are residues of straight-chain aliphatic diols of 2 to 6 carbon atoms.

6. Process for applying to a substrate a coating of fine particles and binder comprising the steps of (a) inter-reacting in solution excess soluble symmetrical, unbranched, aromatic diisocyanate with hydroxyl-terminated polyester or polyether having an average molecular weight of 200–3000 to provide a mixture of isocyanate-capped polyurethane and unreacted aromatic diisocyanate, (b) chain-extending the mixture with short-chain aliphatic diol, 10–100 mole percent of which contains tertiary nitrogen to produce a soluble hydroxylterminated polyurethane block copolymer, (c) mixing said polyurethane block copolymer with fine particles and sufficient volatile vehicle to provide a coatable dispersion wherein the weight of the particles exceeds that of the copolymer, (d) coating said dispersion onto a substrate, and (e) drying the coating.

7. Process as defined in claim 6 wherein subsequent to step (b) is the further step of quaternizing at least some of the tertiary nitrogen of the block copolymer.

8. Process as defined in claim 6 wherein less than 100 mole percent of the diol contains tertiary nitrogen and step (b) first involves chain-extending the isocyanate-capped polyurethane produced in step (a) with a portion of the diol which contains tertiary nitrogen in the presence of excess isocyanate and then further chainextending a portion of the diol which has no tertiary nitrogen to produce the hydroxyl-terminated copolymer.

9. In the manufacture of a magnetic recording medium comprising a backing member and at least one coating comprising fine particles and a binder, a process for applying said coating comprising the steps of:

(a) inter-reacting in solution excess soluble symmetrical, unbranched, aromatic diisocyanate with hydroxyl-terminated polyester or polyether having an average molecular weight of 200–3000 to provide a mixture of isocyanate-capped polyurethane and unreacted aromatic diisocyanate, (b) chain-extending the mixture with a short-chain aliphatic diol containing tertiary nitrogen, (c) further chain-extending with a short-chain aliphatic diol which has no tertiary nitrogen in an amount providing 40–90 mole percent of the total diol to produce a soluble hydroxyl-terminated polyurethane block copolymer, (d) mixing said polyurethane block copolymer with fine particles and sufficient volatile vehicle to provide a coatable dispersion wherein the weight of the particles exceeds that of the copolymer, (e) coating said dispersion onto a substrate, and (f) drying the coating.

10. Process as defined in claim 9 wherein said fine particles are magnetizable particles.

11. Process as defined in claim 9 wherein following step (c) is an additional step of quaternizing at least part of the tertiary nitrogen.

12. Process as defined in claim 9 wherein said volatile vehicle primarily comprises nonaromatic polar solvent.

13. Process as defined in claim 9 wherein step (d) includes the addition of a crosslinking agent for said polyurethane block copolymer.

14. Process as defined in claim 13 including the further step of (g) smoothing the dried coating to peak-to-peak surface roughness of less than 0.2 micrometers.

* * * * *